United States Patent

[11] 3,550,499

| [72] | Inventor | Stanley D. Eilenberger, 32 Summit Place, Middletown, Conn. 06457 |
|---|---|---|
| [21] | Appl. No. | 803,202 |
| [22] | Filed | Feb. 28, 1969 |
| [45] | Patented | Dec. 29, 1970 |

[54] SCREW ANCHOR
9 Claims, 11 Drawing Figs.

[52] U.S. Cl. .................................................. 85/84
[51] Int. Cl. ...................................... F16b 13/04, F16b 13/12
[50] Field of Search .......................................... 85/84, 83, 82, 85, 36; 24/73SC, 73BMF;

[56] References Cited
UNITED STATES PATENTS

| 2,601,803 | 7/1952 | Newman | 85/84 |
| 2,707,013 | 4/1955 | Flora et al. | 85/85X |
| 3,148,579 | 9/1964 | Giovannetti | 85/83 |
| 3,213,745 | 10/1965 | Dwyer | 85/83X |

FOREIGN PATENTS

| 365,857 | 1/1963 | Switzerland | 85/84 |

Primary Examiner—Ramon S. Britts
Attorneys—Robert B. Russell and Henry C. Nields ABSTRACT: An elongated hollow member is used as a screw anchor. It is driven into a soft material which material is not normally suitable for holding screws. The hollow member has a split end which is tapered to a blunt point for ease of penetration into the soft material. Also, the split end is indented or crimped to provide a pair of inverse shoulders within the hollow member. These shoulders serve to force the halves of the split end apart so as to lock the anchor in the soft material when a connector is forced directly into the hollow member. Thread engaging tongues in the anchor are employed to hold the screw in the anchor. They are functionally independent from the locking members. A pair of conical ribs help in the various functions, and a pair of compound curved areas in the tubular end portions serve an important strength function.

PATENTED DEC 29 1970　　　　　　　　　　　　　3,550,499
SHEET 1 OF 2
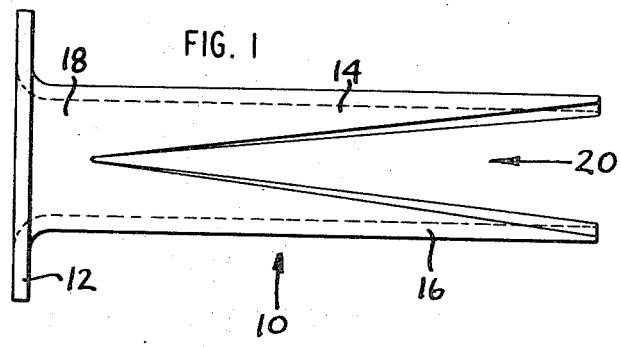
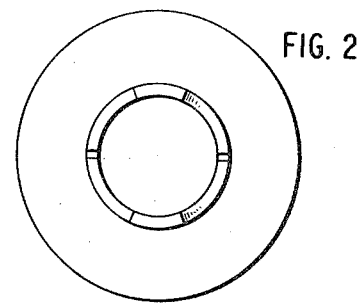
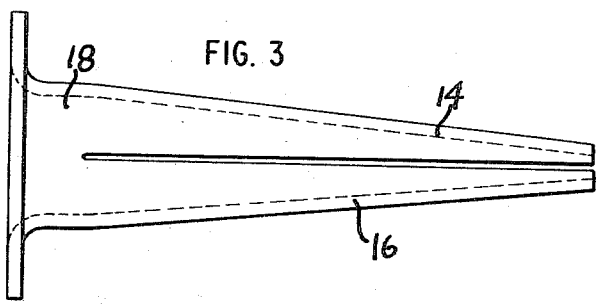
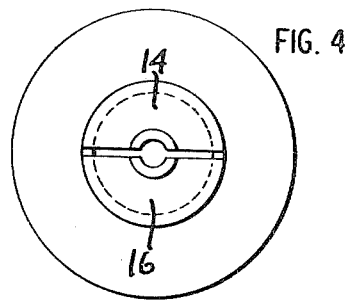
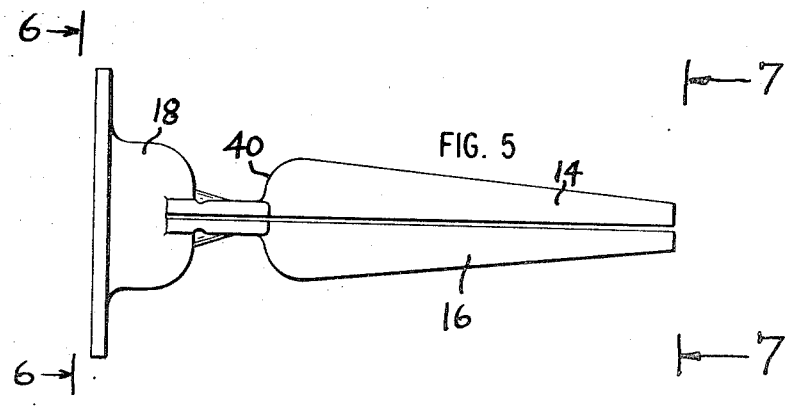
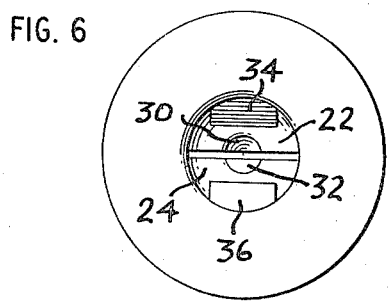
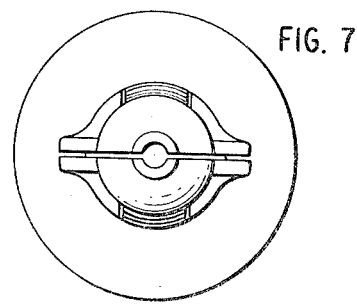
INVENTOR.
Stanley D. Eilenberger
BY Russell+Nields

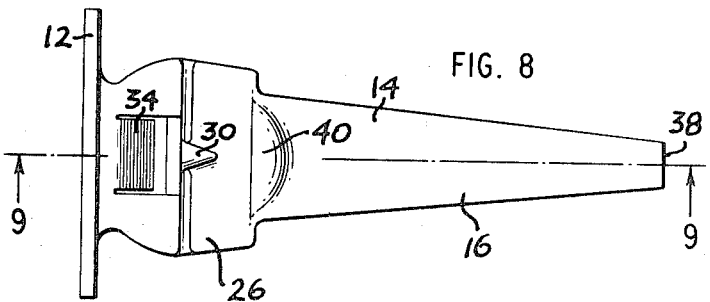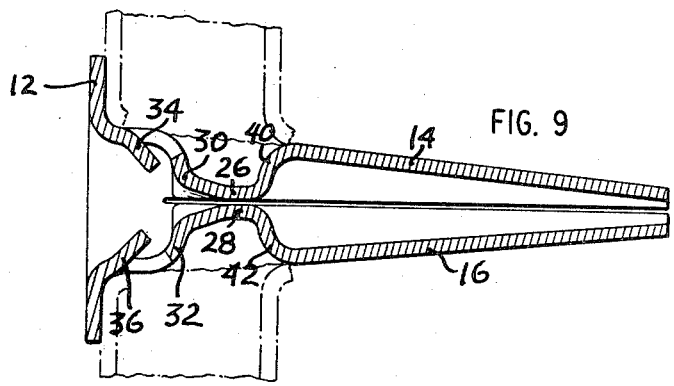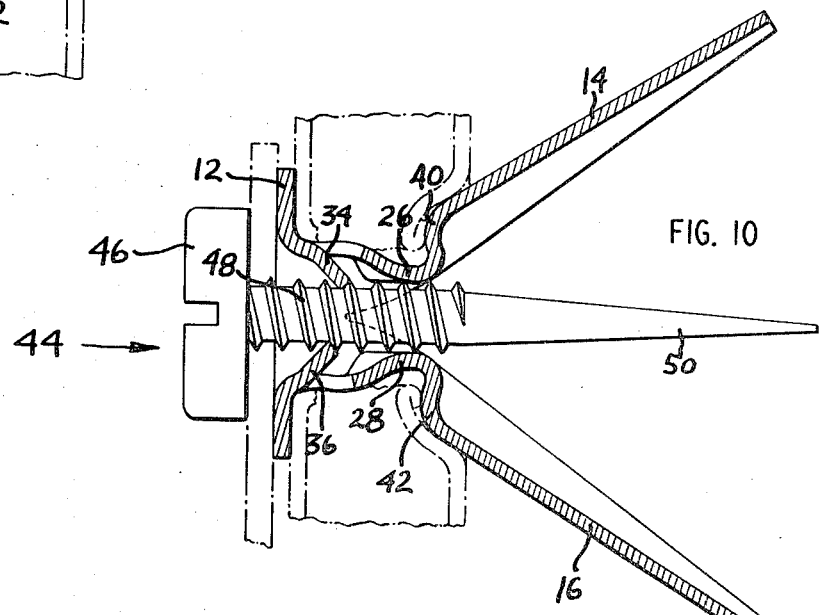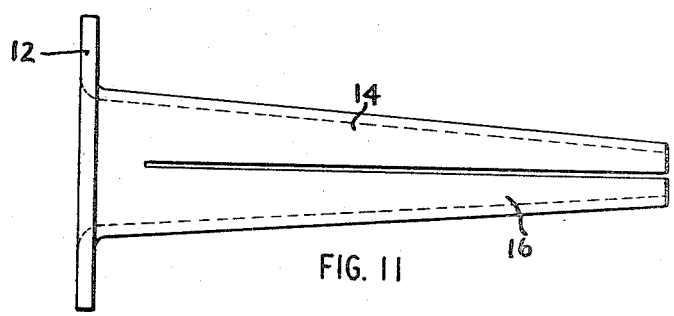

SCREW ANCHOR

The present invention relates to screw anchors and more particularly to a method and apparatus for anchoring screws in a material which is normally unsuitable for holding screws. In one aspect, the invention relates to the anchor itself. In another aspect, it relates to the screw and the anchor in combination. In still another aspect, the invention relates to a method of attaching articles to a wall or the like by which method a connection is made having the tightness and security of a screw connection even though the wall materials are not suitable for holding screws.

A general object of this invention is to provide a screw anchor which is at one and the same time easy to install and secure in its holding power. More specifically, an object is to provide a screw anchor that can be driven into ordinary wall materials such as plaster board or the like by simple hammer blows, and thereafter serve as a secure anchor for a screw. Another object is to provide such a screw anchor which, after it has been driven into ordinary plaster board by hammer blows, can be locked therein against torque by an intermediate operation, not involving torque, prior to tightening up on a screw in said anchor.

Still another object is the provision of means associated with such an anchor for locking same both against extraction and against torque without requiring the formation of a hole greatly in excess of the screw diameter, and with a minimum amount of breakout on the far side of the plaster board. An additional object is to provide, in such a screw anchor, a hinge action for expanding components of the anchor in and beyond the plaster board without requiring separate hinged members and at the same time accomplishing the expansion without materially weakening the anchor. Still another object is to provide in such an anchor, a combination of integrally formed strength elements in a single piece anchor for supporting the anchor against the stresses of being driven into a plaster board or the like, but which also permit lateral expansion of components of said anchor, to anchor same in said plaster board without materially weakening said anchor. Another object is to provide, together with such an anchor, a means for locking same in a hole, which locking means can be removed thereby permitting said anchor to be withdrawn. Another object is to provide such a screw anchor with means for locking the anchor in the plaster board or the like which locking means are functionally independent from the screw tightening means of said screw anchor.

In the accomplishment of these and other objects of this invention in a preferred embodiment thereof, the anchor is formed from a hollow tubular member which resembles an eyelet shell. The head of the anchor, which remains exposed during use, comprises an arcuate flange formed at the end of a shank portion at one end of the eyelet shell. Continuing along the eyelet shell from the shank, the eyelet shell is split and tapers to a blunt split end. In addition, adjacent to the shank, but in the split area, the end is also indented or crimped to form internal shoulders on the interior surfaces of the hollow eyelet shell.

It is a feature of this general arrangement of the invention that the anchor can be driven into a plaster board wall or the like and thereafter a pointed member can be driven into the anchor so as to force the indented shoulders apart and thereby to separate the halves of said split end by bending them laterally. In this way, the anchor can be locked in the plaster board by the direct thrust of a smooth pointed member, or even by driving in a screw without turning it.

In addition to the foregoing structure, the shank of the eyelet shell is stamped to provide a pair of inwardly extending thread engaging tongues, and it is a feature of this invention that neither the tongues themselves nor the action of tightening a screw thereon serves to expand said split end. In this way, the locking and screw tightening functions of the anchor are made independent of each other except that while the screw is in place, the expanded elements of the split end cannot retract so as to unlock the anchor.

One feature of this invention relates to the combination of a special form of the screw and the anchor. The special screw employs a relatively smooth, tapered point and has screw threads only adjacent to the screw head. In this way, the smooth portion of the special screw can be driven into the anchor in order to expand the split end portions of the eyelet shell and lock the anchor in the wall, and thereafter the screw can be tightened by engagement between the screw threads and the thread engaging tongues.

Another feature relates to the process of this invention whereby a pointed screw anchor is driven into a material which is unsuitable for holding screws; next the anchor is locked in said material by expanding a portion of said anchor by a direct straight line driving force; next the threads of a screw are engaged in said anchor by thread engaging tongues and tightened.

An additional structural feature comprises a pair of tapered hollow ribs located in the middle of the indented area, and opening axially into the cavity of the shank area. These tapered ribs serve a quadruple function. First, they stiffen the indented area and help withstand the hammer blows of driving the anchor into the wall. Second, they provide a point centering cavity within the shank area at the base of the indented inverse shoulders. Third, they provide a slanting surface which helps start the expansion of the halves of the split end of the eyelet shell. And fourth, they serve to distribute the bending forces of expansion over a wider area so as to minimize the weakening effect of a sharp bend in the indented shoulders.

Another structural feature resides in the configuration of the area in relation to that tapered split end, and the shank portion. Both the shank and the tapered split end portions are totally supported circumferentially when the indenting shoulders are formed. The effect is to form swaged, compound curved surfaces adjacent to the indented shoulders, and in this way the overall longitudinal strength of the anchor is greatly enhanced. In addition, the flat essentially extended area of the indented shoulders provides a widened base against which the spreading forces of the pointed member are applied. This ensures adequate spreading action and also minimizes destructive abrasion from the screw threads as they are subsequently turned to tighten the screw.

Additional objects and features of this invention will become apparent from the following description of a preferred embodiment thereof selected for purposes of illustration and shown in the accompanying drawings in which:

FIG. 1 is a view in a side elevation of a hollow shell component from which the screw anchor of this invention is made;

FIG. 2 is a view in end elevation of the component of FIG. 1;

FIG. 3 is a view in side elevation of the component of FIG. 1 with end portions compressed;

FIG. 4 is a view in end elevation of the component of FIG. 3;

FIG. 5 is a view in side elevation of the component of FIG. 4 after indentation;

FIG. 6 is a view in end elevation along the lines 6–6 of FIG. 5;

FIG. 7 is a view in end elevation along the lines 7–7 of FIG. 5;

FIG. 8 is a plan view of the component of FIG. 5;

FIG. 9 is a view in cross section along the lines 9–9 of FIG. 8 after insertion into plaster board or the like;

FIG. 10 is a view in cross section of the component of FIG. 9 after insertion into plaster board or the like and tightening of a screw; and FIG. 11 is a view in side elevation of a form of eyelet blank employing a continuous taper.

The preferred embodiment of this invention herein shown comprises a screw anchor made from a hollow shell component indicated at 10 in FIG. 1. One end of component 10 is provided with a flanged head 12. The other end is split and comprises tapered end portions 14 and 16. A cylindrical shank portion 18 is located between the head 12 and the end portions 14 and 16. From FIG. 1 it will be seen that component 10 resembles an eyelet and that the split end portions are formed by cutting out a pair of longitudinal wedges in the area indicated at 20. With reference to FIG. 11 it will be seen that the eyelet can alternatively employ a continuous taper.

The component 10 of FIG. 1 is then stamped to form a blunt tapered point out of the end portions 14 and 16 as may be seen in FIGS. 3 and 4.

Next, the component 10 is again stamped to conform to the configuration shown in FIGS. 5—9 in which the body of end portions 14 and 16 is indented from each side at 22 and 24 to form inverse shoulders 26 and 28 on the inner surfaces of the hollow member (see FIGS. 6 and 8). In addition, centrally of the shoulders 26 and 28 are formed tapered hollow conical ribs 30 and 32 respectively. And finally, in the upper and lower portions of the shank 18 a pair of inwardly extending thread engaging tongues 34 and 36 respectively are formed.

With a screw anchor of this construction, the operation is as follows. First, the anchor is driven into a plaster board wall or the like by simple hammer blows applied to the head 12. As shown, the anchor is suitable for penetration into many materials including plywood, composition board, asbestos sheeting, plaster, etc. The preferred taper of end portions 14 and 16 is about 10° and they terminate in a blunt end 38. With this configuration a minimum of material is broken out of the back of the plaster board. In fact, it has been found that a blunt end tapered in this fashion actually breaks out less material than a sharp end.

With reference to FIGS. 5, 8 and 9, it will be seen that the crimping of end portions 14 and 16 adjacent to shoulders 34 and 36 establishes a swaged compound curve in the areas indicated at 40 and 42. This is important in the context because it stiffens the end portions 14 and 16 against collapse or lateral deformation under the compressive forces exerted by a hammer between the head 12 and the blunt end 38.

After the anchor has been fully driven into the plaster board (see FIG. 9), it is then ready for the locking operation. This is done by inserting a pointed instrument into the shank portion 18 and into the cavity formed by the hollow conical ribs 30 and 32, and driving the same in between shoulders 26 and 28 to force end portions 14 and 16 apart. In this context, the ribs 30 and 32 serve a quadruple function. First, they provide longitudinal stiffening in the area of shoulders 26 and 28 which strengthens the anchor against buckling while being driven into the plaster board. Second, they provide a cavity into which the pointed instrument can be inserted to ensure correct positioning. Third they provide a wedge surface against which the force of the pointed instrument is applied in order to help start the desired lateral motion of the shoulders 26 and 28. Fourth, as the shoulders 26 and 28 commence separation, the ribs tend to distribute the bending forces in the metal so as to avoid the weakening effect of a sharp crease or line of bend. In addition, it will be noted that the extended flat area of the shoulders 26 and 28 provides a broad base to receive and spread the expansion forces, and also to minimize destructive abrasion which the screws threads can cause when they are subsequently turned.

The pointed instrument is driven in until the end portions 14 and 16 separate to an angle of about 35°o 45°a s may be seen in FIG. 10. In some wall materials of greater thickness, the ends may not separate as fully as shown, but, in any event the shoulders 26 and 28 and adjacent compound curved areas 40 and 42 of the ends 14 and 16 will separate substantially as shown in FIG. 10.

It will be understood, of course, that the locking function is accomplished by the separation of shoulders 26 and 28 and the consequent wedging of the compound curved areas 40 and 42 into the surrounding plaster board or the like. When they are fully wedged apart as shown, the anchor is locked both against torque and against extraction, and it is important to note that the locking function has been accomplished without torque and by means of the simple direct penetration of a pointed instrument—which may be a suitably sized punch, nail, screw or the like.

In a preferred embodiment of the invention, a partially threaded connector indicated at 44 is employed, having a slotted screw head 46, a threaded shank 48, and a pointed end 50. Such a connector can be driven in, to accomplish the locking function, and then the screw may be tightened in sequence.

When a connector of the type of connector 44 is employed, the locking function is accomplished by driving the pointed end 50 in far enough for at least a few of the threads on shank 48 to engage the thread engaging tongues 34 and 36. It will be understood, of course, that the tongues 34 and 36 are positioned and dimensioned to fit into the threads of a screw of complementary dimension, and as the connector 44 is driven in, the tongues 34 and 36 snap over the first several threads depending upon how far in the connector 44 is driven. Thereafter, when the connector 44 is turned to tighten it, the threads come into abutment with the ends of the tongues and further tightening then serves to wedge the tongues tightly into the threads. In this way, a tight and secure screw connection is made.

An important feature of this arrangement is that the thread engaging tongues are not involved in the locking function. Thus, they are not distorted, marred or swaged by the heavy wedging and compressive forces which the pointed instrument, or the point 50, applies to the shoulders 26 and 28. Of course, some distortion occurs in both the the innermost threads of the screw and the thread engaging tongues 34 and 36 during insertion, but it is only minor and is not significantly detrimental. This feature also provides even when a conventional screw is employed provided it is driven directly into the anchor to a point where the locking function is complete prior to tightening same by means of the screw threads.

Another feature of this invention is that the anchor will remain locked as long as a screw is lodged in it, but removal of the screw leaves the anchor in condition for removal from the wall. This can be done by inserting a short machine screw in the anchor only far enough to engage tongues 34 and 36. Pulling on the short screw with sufficient pressure will then force the compound curved areas 40 and 42 inwardly and permit extraction.

While the invention has been described with reference to the illustrated preferred embodiment, it will be appreciated that numerous modifications and variations will now be apparent to those skilled in the art in the light of these teachings and therefore it is not intended to limit the invention to the precise form herein shown.

I claim:

1. A one-piece screw anchor formed of sheet or tubular material comprising a generally hollow member having a flanged head, a shank portion extending from said flanged head and a tapered split end portion contiguous with said shank portion; said end portion having split walls forming inverse shoulders adjacent to said shank portion, and means to stiffen said member against collapse and to provide a positioning cavity; and said shank portion having thread engaging means defined by a plurality or radially inwardly extending tongues formed from said material, said tongues being sufficiently inclined in the direction of said end portion whereby a pointed member driven into said positioning cavity by a driving blow forces said shoulders to separate thereby pivoting apart the split walls of said split end portion and thereby locking said anchor in a surrounding receptor material without damage to said thread engaging means.

2. A screw and screw anchor combination comprising a screw member having a head with tool receiving means thereon, a threaded shank and a tapered lead end; a one-piece anchor formed of sheet or tubular material including a hollow anchor base having a flanged head, a shank portion extending from said flanged head and a tapered split end portion contiguous with said shank portion, and means to stiffen said member against collapse and to provide a positioning cavity; said end tapered to permit said base to penetrate, under driving force, a material suitable for receiving said anchor; means operatively associated with said hollow base for receiving the tapered end of said screw and for expanding the tapered end of said hollow anchor base into antitorque engagement with said material in response to the direct longitudinal driven entrance therein of said tapered end of said screw member; and flexible thread engaging elements in said shank of said anchor base defined by a plurality of radially inwardly extending tongues formed from said material, said tongues being sufficiently inclined in the direction of said end portion to permit driven entrance of said tapered end of said screw member without damage to said thread engaging elements, and said thread engaging elements being capable of cooperation in threaded engagement with said threaded shank of said screw member.

3. The screw and screw anchor combination defined in claim 2 further characterized by said hollow anchor base comprising: a shell; walls in said shell forming a longitudinally extending split between halves thereof midway of said shell to the extremity of said inner end; and indentations in said shell defining inverse shoulder portions therein extending from opposed sides toward the base of said split substantially to close the passage in said shell; whereby entrance of the tapered end of said screw member into said hollow base contacts the base of said shoulder portions and communicates through said shoulder portions an expanding force to the split halves of said tube at the inner end thereof.

4. The screw and screw anchor combination defined in claim 2 further characterized by: said thread engaging elements in said anchor base being resilient and having a dimension therebetween less than a diameter of said tapered end of said screw; whereby said elements are depressed by entrance of said tapered end of said screw and return at least in part to a position of engagement with the threaded shank of said screw.

5. The screw and screw anchor combination defined in claim 3 further characterized by: said inverse shoulder portions presenting a substantially broad, flat base to receive and distribute said expanding force.

6. The screw and screw anchor combination defined in claim 3, further characterized by having tapered hollow conical ribs being both centrally of said inverse shoulder portions and adapted to jointly form a positioning cavity for said screw and to stiffen split shell walls.

7. A one-piece screw anchor formed of sheet or tubular material comprising: a hollow tubular member having a hollow shank portion and a hollow tapered end portion; screw engaging means defined by a plurality of radially inwardly extending tongues formed from said material inclined in the direction of said end portion in said shank portion; means in said end portion for reinforcing same against longitudinal axial compression including a multiplicity of swaged compound curved surface portions formed in said end portion; means including indented shoulders adjacent to said reinforcing means operatively associated with said shank and end portions for expanding said end portion and forcing said compound curved portions outwardly and into locking engagement with a surrounding material in response to the direct thrust of a pointed instrument into said tubular member.

8. The screw anchor defined in claim 7, further characterized by having tapered hollow conical ribs being both centrally of said inverse shoulder portions and adapted to jointly form a positioning cavity for said screw and to stiffen said split shell walls.

9. A screw and screw anchor combination comprising a screw member having a head with tool receiving means thereof, a threaded shank and a tapered lead end; a one-piece anchor formed of sheet or tubular material including a hollow anchor base having an outer and an inner end, said anchor base comprised of a shell; walls in said shell forming a longitudinally extending split between halves thereof midway of said shell to the extremity of said inner end; and indentations in said shell defining inverse shoulders portions therein extending from opposed sides toward the base of said split substantially to close the passage in said shell, said inner end of said anchor base tapered to permit said base to penetrate, under driving force, a material suitable for receiving said anchor; means operatively associated with said hollow base for receiving the tapered of said screw and for expanding the tapered end of said hollow anchor base into antitorque engagement with said material in response to the direct longitudinal driven entrance therein of said tapered end of said screw means, said means consisting of the action of the tapered end of said screw contacting the base of said shoulder portions and communicating through said shoulder portions an expanding force to the split halves of said tube at the inner end thereof; and flexible thread engaging elements in said anchor base adjacent said outer end capable of cooperation in threaded engagement with said threaded shank.